United States Patent [19]

Wegeng et al.

[11] Patent Number: 5,420,696
[45] Date of Patent: May 30, 1995

[54] IMAGE DATA TRANSFER ARCHITECTURE AND METHOD FOR AN ELECTRONIC REPROGRAPHIC MACHINE

[75] Inventors: Donald L. Wegeng, Rochester; Jeff C. Carter, Fairport; Joseph W. Ward, Pittsford; Thomas G. Beaman; Gregory C. Sosinski, both of Fairport, all of N.Y.; Todd M. Austin, Madison, Wis.

[73] Assignee: Xerox Corporation, Stamford, Conn.

[21] Appl. No.: 80,799

[22] Filed: Jun. 24, 1993

[51] Int. Cl.⁶ ............................................. H04N 1/00
[52] U.S. Cl. .................................. 358/408; 358/406; 395/162; 345/190
[58] Field of Search ............... 358/400, 468, 404, 403, 358/406; H04N 1/00; 395/162, 135, 114, 115; 345/202, 190

[56] References Cited

U.S. PATENT DOCUMENTS

| | | |
|---|---|---|
| 4,203,154 | 5/1980 | Lampson et al. . |
| 4,587,633 | 5/1986 | Wang et al. . |
| 4,817,181 | 3/1989 | Kamiya . |
| 4,827,349 | 5/1989 | Ogata et al. . |
| 4,891,709 | 1/1990 | Adams . |
| 4,953,103 | 8/1990 | Suzuki ................................ 395/115 |
| 5,187,570 | 2/1993 | Hibi et al. ............................ 358/515 |
| 5,231,679 | 7/1993 | Matsuura et al. . |
| 5,251,297 | 10/1993 | Takayanagi ........................ 395/162 |
| 5,276,799 | 1/1994 | Rivshin ............................... 395/162 |
| 5,307,458 | 4/1994 | Freiburg et al. .................... 395/115 |
| 5,367,317 | 11/1994 | Hosotami ............................ 345/190 |

Primary Examiner—Edward L. Coles, Sr.
Assistant Examiner—Kim Yen Vu
Attorney, Agent, or Firm—Oliff & Berridge

[57] ABSTRACT

An image data transfer architecture in which control data and image data are isolated is provided. Bidirectional buffers isolate data buses from the control bus, thereby allowing control to be maintained by an 8-bit programmed microprocessor. The controller microprocessor does not handle image data thereby reducing complex software and support components required of prior multiple 16- and 32-bit microprocessor controller systems. Isolation is achieved by having multiple data buses handling image data at various stages of processing, such as, for example, input image data, compressed image data and output image data. Additional efficiencies are realized by eliminating the inherent delays caused when high speed image output terminals are forced to share data buses with much lower speed image input terminals.

23 Claims, 2 Drawing Sheets

IMAGE DATA TRANSFER ARCHITECTURE AND METHOD FOR AN ELECTRONIC REPROGRAPHIC MACHINE

1. Field of the Invention

The present invention relates generally to an electronic reprographic printing system and more particularly concerns an electronic subsystem (ESS) having a multiple bus architecture that isolates control and data signals, thereby allowing the ESS to operate efficiently using an 8-bit microprocessor controller.

2. Background of the Invention

In general, existing electronic reprographic (ER) machines consist of three major subsystems. These subsystems include the image input terminal (IIT), the electronic subsystem (ESS) and the image output terminal (IOT). Typically, for a high speed printer, the majority of the processing power in existing ESS architectures is needed to perform high speed data transfers in order to keep up with high speed IOTs, and to perform complex image processing functions. Typical high speed IOT transfer rates are in the range of up to 135 pages per minute (corresponding to 12,000 characters per second, or 720,000 characters per minute, for single spaced elite typed pages). Furthermore, high speed IOTs may have high resolution imaging, on the order of 600 by 600 pixels per square inch, for example, the corresponding image data transfer rates are in excess of 125 million bits per second (for one bit per pixel, black/white printing); color printing, with multiple bits per pixel multiplies these data rates accordingly. In order to keep up with these high speed IOTs, current ESS architectures require one or more, 16 or 32 bit general purpose microprocessors to control the transfer of image data from the IIT to the IOT. These 16 and 32 bit general purpose microprocessors are expensive and generally require the use of expensive support components and complex software to perform their functions. These large microprocessors are also required since they handle image data as well as control signals for the ESS. However, in a digital copier that does not perform complex image processing, the ER machine can rely on the IIT for resolution conversion and digital filtering.

In a high speed ER machine, the IIT is likely to be much slower than the IOT. Therefore, it is likely that scanning will begin well before printing takes place and scanned images will most likely be compressed and buffered on to one or more rigid mass storage disks of a mass storage system at a relatively slow data rate. Printing, on the other hand, requires high speed retrieval from the mass storage disks and decompression prior to transfer to the IOT. Generally, the control signals and the image data utilize a common bus, necessitating a complex control architecture for handling the multiplicity of tasks required of the bus architecture.

SUMMARY OF THE INVENTION

If the image data and control signals are isolated from one another, the need for a complex common bus architecture with its associated high-end microprocessors, related support components and complex software would be eliminated. Further, in view of the above problems relating to highly complex ESS architectures in high speed ER machines, what is needed is a simplified ESS architecture that efficiently controls the flow of image data from the IIT to the IOT and isolates the image data from the control signals, without degrading system performance. Specifically, an architecture utilizing an 8-bit general purpose microprocessor to control data flows over a number of task-specific data buses that are isolated from one another and from the control signals on a separate control bus is needed.

In order to overcome the above and other problems and deficiencies with respect to electronic reprographic systems, the present invention provides an ESS architecture utilizing an isolated multiple bus architecture using a simple 8-bit microprocessor to control data transfers from the IIT to the IOT.

It is, therefore, an object of the present invention to provide an electronic reprographic system having a high speed ESS architecture utilizing a simple programmed 8-bit microprocessor as a controller.

It is another object of the present invention to provide an architecture in which control data is isolated from image data.

It is another object of the present invention to provide a system that uses inherent time constraints of the image input terminal and the image output terminal to realize efficiencies heretofore unrecognized.

It is another object of the present invention to use a multiple bus architecture to isolate various data transfers within the system, thereby providing less complex yet highly efficient data transfers.

It is yet another object of the present invention to reduce the cost and complexity of existing electronic reprographic systems by providing a high speed electronic subsystem using a programmed 8-bit microprocessor for handling control signals only in place of multiple 16- and 32-bit microprocessors that handle both image data and control signals.

It is a further object of the present invention to reduce the cost and complexity of system software without degrading system performance.

To realize this and other objects and to overcome the deficiencies set forth above with respect to conventional electronic reprographic systems, an electronic reprographic machine having a simplified, low cost yet highly efficient image data transfer architecture is provided, comprising: a means for controlling a plurality of data transfer buses and a plurality of data handling devices; a plurality of buses for transferring either data or control signals; a plurality of bidirectional data buffers for isolating the plurality of buses; a plurality of direct memory access controllers for controlling data transfers between the plurality of buses; an input buffer; a data compression means; a data storing means; a data decompression means; and at least one output buffer.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

While this invention is described in detail herein with specific reference to certain illustrated embodiments, there is no intent to be limited to those embodiments. On the contrary, the aim is to cover all modifications, alternatives and equivalents falling within the spirit and scope of the invention as defined by the claims.

Figure 1:
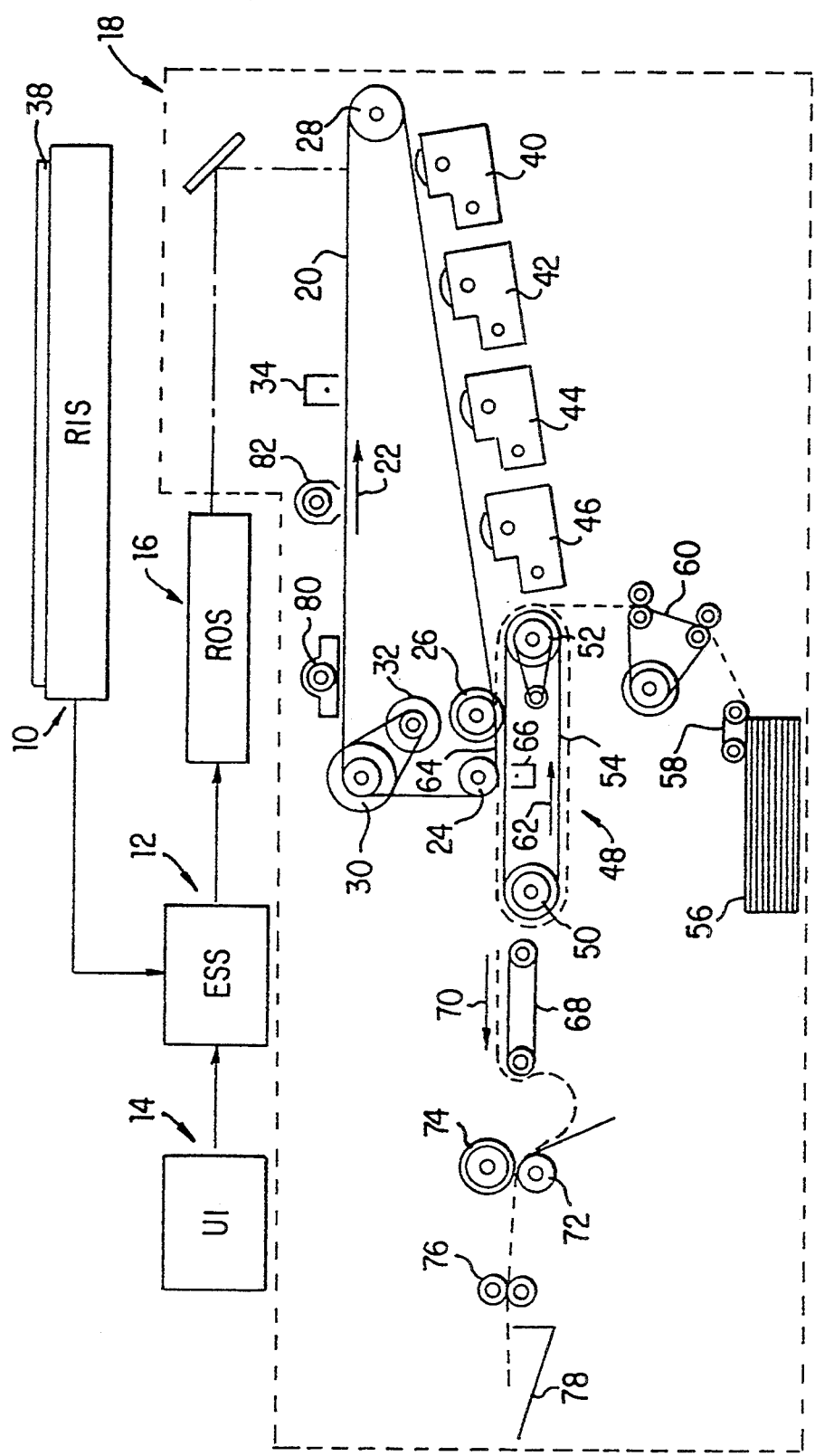
FIG. 1 is a schematic elevational view illustrating an electronic reprographic printing system incorporating the features of the present invention therein.

For a general understanding of the features of the present invention, reference is made to the drawings in which like references have been made throughout to designate identical elements. FIG. 1 is a schematic elevational view of an illustrative reprographic system incorporating the features of the present invention therein. It will become evident from the following discussion that the present invention is equally well suited for use in a wide variety of printing systems and is not necessarily limited in its application to the particular system shown herein.

Turning initially to FIG. 1, during operation of the printing system, an original document 38 is positioned on a raster input scanner (RIS) indicated generally by the reference numeral 10. The RIS contains document illumination lamps, optics, a mechanical scanning drive and a charged coupled device (CCD) array. The RIS captures the entire original document and converts it to a series of raster scan lines and measures a set of primary color densities at each point of the original document. This information is then transmitted to an electronic subsystem (ESS), indicated generally by the reference numeral 12. ESS 12 contains control electronics that prepare and manage the image data flow to the raster output scanner (ROS), indicated generally by the reference numeral 16. A user interface (UI), indicated generally by the reference numeral 14, is in communication with the ESS. The UI enables the operator to control various operator adjustable functions. These functions are limited to rudimentary image control functions rather than complex image manipulation functions of more complex electronic reprographic systems. The output signal from the UI is transmitted to the ESS 12. The signal corresponding to the desired image is transmitted from the ESS 12 to the ROS 16, which creates the output copy image. The ROS 16 lays out the image in a series of horizontal scan lines with each line having a specified number of pixels per inch. The ROS includes a laser having a rotating polygon mirror associated therewith. The ROS exposes the charged photoconductive surface of the printer, indicated generally by the reference numeral 18, to achieve a set of primary latent images. The latent images are developed with developer material to form an image. These developed images are transferred to a copy sheet in superimposed registration with one another to form a highlight and/or color image on a copy sheet. This highlight or color image is then fused to the copy sheet forming a copy. In black and white applications, only one latent image is formed, developed and transferred to the copy sheet.

With continued reference to FIG. 1, a printer or image output terminal (IOT) 18 is an electronic reprographic printing machine. The electrophotographic printing machine employs a photoconductive belt 20. Preferably, the photoconductive belt 20 is made from a polychromatic photoconductive material. Belt 20 moves in the direction of the arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances the belt 20 in the direction of the arrow 22.

Initially, a portion of the photoconductive belt 20 passes through the charging station. At the charging station, a corona generating device, indicated generally by the reference numeral 34 charges the photoconductive belt 20 to a relatively high, substantially uniform potential.

Next, the charged photoconductive surface is rotated to the exposure station. The exposure station includes the RIS 10 having a highlight color original document 38 positioned thereat. The RIS captures the entire image from the original document 38 and converts it to a series of raster scan lines which are transmitted as electrical signals to the ESS 12. The electrical signals from the RIS correspond to the image highlight color densities at each point in the document. The ESS converts the set of signals corresponding to the color densities of the original document 38, to a set of colormetric coordinates. The operator actuates the appropriate keys of the UI 14 to adjust the parameters of the copy. The output signals from the UI 14 are transmitted to the ESS. The ESS then transmits the signals corresponding to the desired image to the ROS 16. ROS 16 includes a laser with rotating polygon mirror blocks. Preferably, a nine block polygon is used. The ROS illuminates the charged portion of the photoconductive belt 20 at a rate of about 600 pixels per inch. The ROS will expose the photoconductive belt to record up to three latent images. Each latent image is adapted to be developed with a different colored developer material. The latent images formed by the ROS on the photoconductive belt correspond to the signals output from the ESS 12. After the electrostatic latent image has been recorded on photoconductive belt 20, belt 20 advances to the electrostatic latent image to the development station. The development station includes a number of individual developer units generally indicated by the reference numeral 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. Developer particles are continually moving so as to provide the brush consistently with fresh developer material. Development is achieved by bringing the brush of developer material into contact with the photoconductive surface. Developer units 40, 42 and 44, respectively apply toner particles of a specific color which correspond to the complement of specific color separated electrostatic latent images recorded on the photoconductive surface as described above. The charged areas are then made visible by having the developer unit 40, 42 and 44 apply specific color absorbing articles onto the electrostatic image recorded on the photoconductive belt 20. Developer unit 46 contains black toner particles and is used to develop the electrostatic latent image formed from a black and white original document. Each of the developer units is moved into and out of the operative position. In the operative position, the magnetic brush is closely adjacent to the photoconductive belt, while in the non-operative position, the magnetic brush is spaced therefrom. During development of each electrostatic latent image only one developer unit is in operative position, the remaining developer units are in non-operative position. This ensures that each electrostatic latent image is developed with toner particles of the appropriate color with comingling. In FIG. 1, developer unit 40 is shown in the operative position with developer units 42, 44 and 46 being in a non-operative position.

After development, the toner image is moved to the transfer station where the toner image is transferred to a sheet of support material, such as, for example, plain paper. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 to a pretransfer transport 60. Transport 60 advances the sheet to sheet transport 48. The sheet is advanced by transport 60 in synchronism with the movement of the gripper. In this way, the leading edge of the sheet arrives at a preselected position, i.e., a loading zone to be received by the open gripper. The gripper then closes, securing the sheet thereto for movement therewith in a recirculating path. The leading edge of the sheet is secured releasably by the gripper. As the belt moves in the direction of arrow 62, the sheet moves into contact with the photoconductive belt, in synchronism with the toner image developed thereon. At transfer zone 64, a corona generating device 66 sprays ions onto the back side of the sheet so as to charge the sheet to the proper magnitude and polarity for attracting the toner image from the photoconductive belt 20 thereto. The sheet remains secure to the gripper so as to move in a recirculating path for a number of cycles corresponding to the number of latent images that need to be transferred in superimposed registration with one another.

After the last transfer operation, the grippers open and release the sheet. Conveyor 68 transports the sheet in the direction of arrow 70, to the fusing station where the transferred images are permanently fused to the sheet. The fusing station includes a heated fuser roll 74 and a pressure roll 72. The sheet 52 passes through the nip defined by the fuser roll 74 and the pressure roll 72. The toner image contacts the fuser roll 74 so as to be affixed to the sheet. Thereafter, the sheet is advanced by forwarding roll pairs 76 to catch tray 78 for subsequent removal therefrom by the machine operator. The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. While the above description relates to a digital color copier, the present invention is equally suited to black and white or highlight color only applications. In these systems, there are fewer latent images and, therefore, correspondingly fewer development stations.

Figure 2:
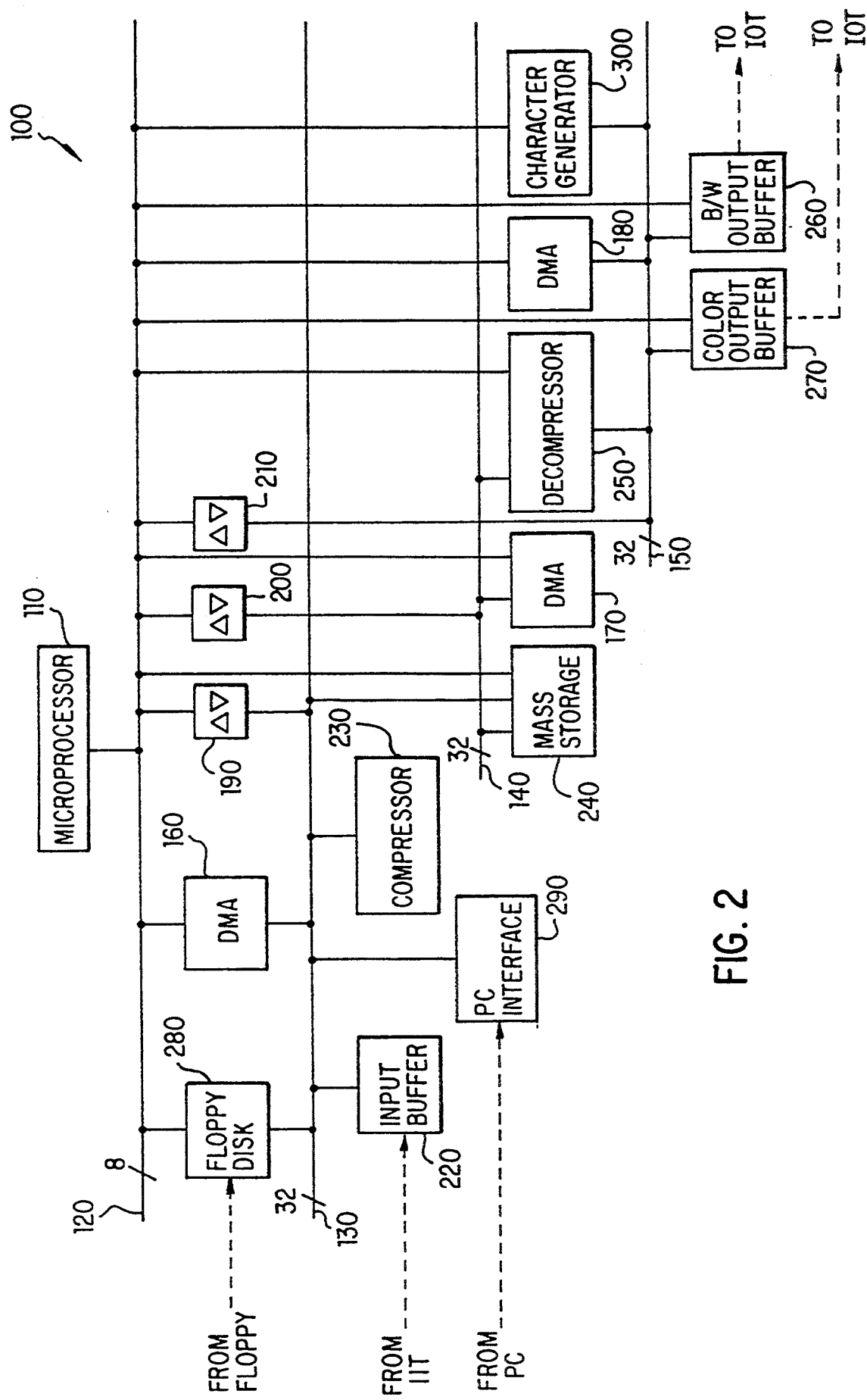
FIG. 2 is a block diagram illustrating an image data transfer architecture in accordance with the present invention.

Referring now to FIG. 2, an ESS architecture 100 is shown. In this architecture, a programmed 8-bit microprocessor 110 controls the flow of control signals and image data over the various buses. The controller 110 never actually transmits or handles image data. There are four separate buses, 120, 130, 140 and 150 that are selectively isolated from one another by bidirectional buffers 190, 200 and 210. The control bus 120 transmits control signals generated by the controller 110 to the various components that are in selective communication with the control bus. The bidirectional buffers 190, 200, 210 are used to isolate control signals on the control bus 120 from the image data buses 130, 140 and 150. By isolating the image data from the control data, the microprocessor 110 only provides high level control and never accesses the image data itself. Therefore, there is no need for a 16- or 32-bit microprocessor with complex software for controlling its functions. An 8-bit processor, such as, for example, an Intel 8085 or the like would be adequate for providing the control functions for the ESS architecture 100 of the present invention.

As image complexity increases and the cost of these microprocessors drops, 16- 32- and even 64-bit microprocessors may be used. The key feature is the separation and isolation of control signals and image data, wherein the microprocessor controller handles only control signals without directly processing any image data. Therefore, the microprocessor controller size is not limiting. Moreover, the microprocessor controller should be characterized by low cost, wide use and availability and ease of programming.

Direct memory access (DMA) controllers 160, 170 and 180 provide the bus master functions for the data buses. Using these DMA controllers in conjunction with the isolation buffers relieves the microprocessor of any image data handling requirements. A key feature of the architecture is the isolation of the image data from the control data, with the DMA controllers providing the bus master function on the data buses. There are three data buses, 130, 140 and 150, used to achieve the required data transfer rate for a high speed IOT. Thus, by isolating the data transfers from control, it is possible to use an 8-bit microprocessor to control data retrievals and transfers in a high speed digital copier.

In high speed electronic reprographic machines, the IIT is likely to be much slower than the IOT. Therefore, it is likely that the scanning of the next image will begin well before printing of the previous image takes place. The scanned images will be compressed and buffered on one or more rigid disks 240 at a relatively slow data rate. This allows one data bus 130 to be used for all input data transfers. Printing, on the other hand, will require high speed retrieval from disks 240 and decompression of the compressed image data. This necessitates separate data buses for data transfers from disks to the decompression stage and from the decompression stage to the output buffer.

Referring once again to FIG. 2, four buses are shown. Starting from the top, the first bus is the control bus 120. The control bus 120 is used by the microprocessor 110 to access the various input/output data, data compression, and storage devices in the system. The second bus is the input bus 130. The input bus 130 is used to transfer input data, i.e., scanned images from the IIT, first from the input buffer to the data compression unit 230 and then from the compressor 230 to the mass storage device 240 which can be, for example, a multiple rigid disk device. The third bus is the decompression bus 140. The decompression bus 140 is used to transfer compressed images from the mass storage unit 240 to the decompression unit 250. The decompressor 250 decompresses the compressed image data and outputs it via the fourth bus which is the output bus 150. The output bus 150 transfers the decompressed images to one or two output buffers 270, 260. For a single color system, i.e., black and white, only one output buffer 260 is required. A highlight color machine would require both the black and white output buffer 260 and the color output buffer 270. Additional output buffers may be required as the number of process colors used increases.

The use of three data buses is required due to the necessary data transfer rate of the high speed IOT. The input bus 130 will be capable of transferring images from input, through compression and to mass storage quickly enough to keep up with currently available IITs. Separate decompression and output buses 140 and 150 are required because of the relatively slow decompression rate that is available from existing decompression devices (slow relative to the data throughput rate required by a high speed IOT). As decompression technology improves, it may be possible to eliminate the decompression bus 140 from the architecture 100.

In addition, the ESS architecture 100 may include a floppy disk drive 280 that can be a source for ASCII character data for output by the IOT. In this situation, the floppy disk 280 supplies the desired ASCII data according to user instructions and outputs this data to the character generator 300 via either the control bus 120 or the input bus 130. ASCII data can be transferred using either the control or input bus due to the 8-bit nature of ASCII character data. The character generator 300 subsequently outputs the converted bitmap data via the output bus 150 to the output buffer 260. The character data transmitted by the floppy disk can be merged with image data from the input buffer to provide a scanned image with a merged character string superimposed on the image (this is sometimes called annotation). Moreover, character data may be encoded in any number of ways, including industry standard Postscript, PCL-xx, EBSDC or any other character encoding technique having an appropriately configured decoder or translator to convert the data to character image data to be output.

Another feature that may be introduced to the architecture is a PC interface 290. The PC interface 290 communicates with a personal computer and transfers image and/or text data to the input bus for compression, storage, decompression and eventual transfer to the output bus 150. The PC interface can be used to merge images with data residing in the input buffer and/or provide merged character data for the images such as, for example, the use of logos or letterheads for certain documents. In addition, both the floppy and the PC interface can be used to provide word processing data to the input bus to be printed out as laser printer output as in conventional laser printers. In addition, any source for bitmapped image data or character data, such as, for example, any industry standard workstation or computing platform; any industry standard network, protocol or data transfer medium, or the like can be used with an appropriate interface.

As illustrated above with respect to the figures, an 8-bit microprocessor controller 110 can be used to control and coordinate the data handling devices without ever processing the image data itself. In addition, there are no direct bus-to-bus transfers. DMA controllers 160, 170 and 180 are used to control data movement on a bit-to-bit level on the various buses. Therefore, the DMA controllers effectively own the data buses and control all data transfers. Therefore, the microprocessor controller 110 need only be a "traffic cop" managing the flow of data from the various data handling devices. Thus, by isolating data transfers to specific data buses of the ESS, it is possible to use the 8-bit microprocessor to control data retrievals and transfers in a high speed digital copier.

While this invention has been described in conjunction with the specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as defined in the following claims.

What is claimed is:

1. An image data transfer architecture, comprising:
   a bus and data transfer controller;
   a control bus transmitting control signals generated by said controller;
   a plurality of data buses transmitting data according to control signals generated by said controller;
   a plurality of bidirectional data buffers in selective communication with said plurality of data buses, said buffers isolating said plurality of buses during a data transfer operation;
   a plurality of direct memory access controllers in selective communication with said plurality of data buses, said direct memory access controllers controlling data transfers between a plurality of data handling devices and said plurality of data buses;
   an input buffer in selective communication with at least one of said plurality of data buses, said input buffer temporarily storing a bitmapped image generated by an image input terminal;
   a data compressor in selective communication with said at least one of said plurality of data buses, said data compressor compressing said bitmapped image to form a compressed bitmapped image;
   a data storage device in selective communication with said at least one of said plurality of data buses, said data storage device storing said compressed bitmapped image;
   a data decompressor in selective communication with said at least one of said plurality of data buses, said data decompressor receiving said compressed bitmapped image data from said data storage device via at least one of said plurality of data buses and decompressing said compressed bitmapped image to reform said bitmapped image; and
   at least one output buffer in selective communication with at least one of said plurality of data buses to temporarily store said bitmapped image prior to transmission of said bitmapped image to an output device.

2. The image data transfer architecture of claim 1, wherein said bus and data transfer controller is a programmed microprocessor.

3. The image data transfer architecture of claim 2, wherein said programmed microprocessor is an eight-bit programmed microprocessor.

4. The image data transfer architecture of claim 1, further comprising:
   a floppy disk drive in selective communication with at least one of said plurality of data buses, said floppy disk drive providing character image data directly to said image data transfer architecture.

5. The image data transfer architecture of claim 1, further comprising:
   a personal computer interface in selective communication with at least one of said plurality of data buses, said personal computer interface providing character and bitmapped image data directly to said image data transfer architecture from a personal computer.

6. The image data transfer architecture of claim 5, wherein said character and bitmapped image data provided directly by said personal computer is merged with an existing image scanned into the image data transfer architecture via said image input terminal.

7. The image data transfer architecture of claim 4, further comprising:
a character generator in selective communication with said floppy disk, said character generator providing said character image data to said output buffers.

8. The image data transfer architecture of claim 7, wherein said character image data provided by said character generator is merged with an existing image scanned into the image data transfer architecture via said image input terminal.

9. The image data transfer architecture of claim 1, wherein said plurality of data buses comprise:
a control bus providing control signals from said controller to said plurality of data handling devices;
an input bus providing transmission of image data between data handling devices, including said input buffer, said data compressor, said data storage device and at least one of said plurality of direct memory access controllers;
a decompression bus providing transmission of compressed bitmapped image data between said input bus, said data storage device, said data decompressor and at least one of said plurality of direct memory access controllers; and
an output bus providing transmission of decompressed image data, said at least one output buffer, a character generator and at least one of said plurality of direct memory access controllers.

10. An image data transfer apparatus, comprising:
controller means for controlling a plurality of data transfer buses and a plurality of data handling devices;
a plurality of buses for transferring data and control signals according to various signals initiated by said controller means;
a plurality of bidirectional data buffers selectively connected to said plurality of buses for isolating said plurality of buses from one another in accordance with signals received from said controller means;
a plurality of direct memory access controllers for controlling data transfers between said plurality of data handling devices via said plurality of buses;
an input buffer selectively connected to at least one of said plurality of buses for receiving bitmapped image data from an image input means;
data compression means selectively connected to at least one of said plurality of buses for compressing said bitmapped image data to form a compressed bitmapped image;
data storage means for storing said compressed bitmapped image;
data decompression means for decompressing said compressed bitmapped image received from said data storage means via at least one of said plurality of buses to reform said bitmapped image;

at least one output buffer for temporarily storing said bitmapped image received from said data decompression means via at least one of said plurality of buses prior to transmission of said bitmapped image to an image output means.

11. The image data transfer apparatus of claim 10, wherein said controller means is a programmed microprocessor.

12. The image data transfer apparatus of claim 11, wherein said microprocessor is an eight-bit microprocessor.

13. The image data transfer apparatus of claim 10, further comprising:
a floppy disk drive selectively connected to at least one of said plurality of buses for providing character image data to said image output means.

14. The image data transfer apparatus of claim 10, further comprising:
a personal computer interface means for providing a direct connection between said image data transfer apparatus and a personal computer, said personal computer directly providing bitmapped image data and character image data to said image data transfer apparatus.

15. The image transfer apparatus of claim 13, further comprising:
a character generator in selective communication with said floppy disk, said character generator providing character image data to said output buffers.

16. The image data transfer apparatus of claim 15, wherein said character image data provided by said character generator is merged with an existing image scanned into the image data transfer apparatus via said image input means.

17. The image data transfer apparatus of claim 14, wherein said character and bitmapped image data provided by said personal computer is merged with an existing image scanned into the image data transfer apparatus via said image input means.

18. The image data transfer apparatus of claim 10, wherein said plurality of buses comprise:
a control bus for transmitting control signals from said control means to said data handling devices, said bidirectional buffers, said direct memory access controllers and said data storage device;
an input data bus for receiving bitmapped image data from said image input means and transmitting said bitmapped image between said input buffer and said data compression means and between said data compression means and said data storage means;
a decompression bus for transferring said compressed bitmapped image data from said data storage means to said decompression means; and
an output data bus for receiving said bitmapped image data from said decompression means and transmitting said bitmapped image data to said at least one output buffer and transmitting said bitmapped data from said at least one output buffer to said image output means.

19. An image data transfer architecture, comprising:
a control bus operatively connected to a programmed microprocessor controller, a floppy disk, a first, second and third direct memory access controller, a first, second and third bidirectional buffer, a character generator and at least one output controller, wherein said control bus transmits control signals generated by said microprocessor controller to control data traffic on a plurality of buses and said control bus providing data transmission capability between said floppy disk and said character generator;

an input bus operatively connected to said floppy disk, said first direct memory access controller, said first bidirectional buffer, an input buffer, a data compressor, a personal computer interface and a data storage device, wherein said input bus transmits bitmapped image data from an image input device to the input buffer and from the input buffer to the data compressor and a compressed bitmapped image from the data compressor to the data storage device;

a decompression bus operatively connected to said data storage device, said second direct memory access controller, said second bidirectional buffer and a data decompressor, wherein said decompression bus transmits compressed bitmapped image data from said data storage device to said data decompressor; and an output bus operatively connected to said data decompressor, said third direct memory access controller, said third bidirectional buffer, said character generator and said at least one output buffer, wherein said output bus transmits bitmapped image data from said data decompressor and said character generator to said at least one output buffer.

20. The image data transfer architecture of claim 19, wherein the image input device is at least one of a personal computer and an image input terminal.

21. The image data transfer architecture of claim 20, wherein the image input terminal is a raster input scanner.

22. The image data transfer architecture of claim 19, wherein the programmed microprocessor is an eight-bit microprocessor.

23. The image data transfer architecture of claim 19, wherein the character generator convert ASCII data to character image data to be output.

* * * * *